2,871,159

THYROTROPIC HORMONE SEPARATION

Lottie J. Piotrowski, Chicago, Leo Rienks, Oak Park, and Myron D. Grossnickle, Homewood, Ill., assignors to Armour and Company, Chicago, Ill., a corporation of Illinois No Drawing. Application October 12, 1953
Serial No. 385,708

12 Claims. (Cl. 167—74)

This invention relates to thyrotropic hormone separation and particularly to the separation of thyrotropin from gonadotropin.

The thyrotropic hormone, or TSH (thyroid-stimulating-hormone), as it is commonly called, is a substance obtained from the anterior lobe of the pituitary gland. When administered parenterally, TSH induces specific effects upon the thyroid gland of mammals. The hormone is apparently formed only in the anterior lobe of the pituitary, and the evidence is overwhelming that a substance having identical or comparable properties is found in all vertebrate classes. TSH is considered to be a single substance of a protein character. Several workers have postulated the existence of two or possibly three thyroid stimulating principles in the anterior lobe of the pituitary, however, the evidence for such hypotheses is not complete or convincing. In this application the thyrotropic hormone (TSH) will be considered as a single entity for purpose of simplicity.

Commercially TSH is obtained mainly from the pituitary glands of cattle. Hog pituitary glands are also a good source of TSH, but they are presently used as a source for ACTH in preference to TSH, due to the fact that hog pituitaries are relatively rich in ACTH compared to cattle pituitaries.

Heretofore various methods have been developed for the extraction of TSH from pituitary glands and its separation from the other non-thyroid stimulating proteins found in pituitary glands, many of which are extracted under the same conditions as TSH. The procedure generally used can be outlined as follows: The pituitary gland, or, as is usually the case, the anterior lobe of the pituitary gland is reduced to a fine state of division and suspended in a dilute ionic solution. In this way the protein constituents of the pituitary are suspended or dissolved in the solution. The insoluble pituitary tissue is separated from the solution by suitable means, e. g. centrifugation. The inert and contaminant proteins are then removed by precipitation and centrifugation; the TSH remaining in solution. The hormone is then precipitated and separated from the solution. This crude TSH precipitate is then purified by further chemical processing.

One of the problems encountered in prior art processes is that of separating TSH from gonadotropin which is an undesirable contaminant because of its unwanted physiological effects when administered with TSH. However, gonadotropin and TSH are of similar solubility and therefore tend to extract and precipitate under similar conditions. Consequently, it is very difficult to make a substantially complete separation of TSH from gonadotropin, especially in a single fractionation.

It is therefore a general object of this invention to provide a method for separating and purifying the thyrotropic hormone. A more specific object is to provide a method for the separation of thyrotropin from gonadotropin. It is also an object of this invention to provide a method for separating thyrotropin from other non-thyroid stimulating proteins. Further objects and advantages will appear as the specification proceeds.

It has been believed heretofore that alcohol at low concentrations is not a precipitating agent for TSH, and that at high concentrations it precipitates both TSH and gonadotropin. For example, in the Annals of the N. Y. Academy of Sciences, vol. 50, 466–490 (1949), is found the following: "It (TSH) is soluble in dilute solutions of organic solvents miscible with water, such as 30 to 40% alcohol or acetone, but becomes progressively insoluble in more concentrated solutions, such as 60–80% acetone." This is further confirmed by the report of Fraenkel-Conrat et al., J. Biol. Chem., vol. 135, 199–212 (1940), which reports that inert proteins precipitate at 50% ethanol, but from the TSH remaining solubilized in the supernatant, highly potent thyrotropic fractions can be obtained.

Proceeding contrary to the teaching and understanding of the art we have discovered that TSH can be selectively precipitated with concentrations of from 5 to 35% of a water-miscible alcohol. It has been further discovered that in this fractionation procedure the TSH precipitates while gonadotropin and other non-thyroid stimulating proteins remain in solution. This invention is based primarily on these unexpected discoveries, which permit TSH to be efficiently separated as a precipitate from a protein mixture containing TSH, gonadotropin, and other non-thyroid stimulating proteins.

The alcohol fractionation step of this invention can be performed on any aqueous solution of a protein mixture derived from pituitary glands and containing TSH in admixture with other non-thyroid stimulating proteins. As indicated above, it is particularly adapted for use when the protein mixture contains both TSH and gonadotropin. The alcohol fractionation step can be preceded or succeeded with various other purification steps known to the art.

Ethanol is the preferred precipitating agent for use in this invention, but other monohydroxy alkanes containing less than four carbon atoms can also be used, such as methanol, propanol, and isopropanol. As indicated above, alcohol concentrations of from 5 to 35% are operative. However, it is preferred to employ alcohol concentrations ranging from 15 to 35% and usually optimum results can be obtained within the range from 15 to 30%. The temperature of the aqueous solution during alcohol fractionation should be maintained at a sufficiently low value to prevent denaturing of the TSH. The temperature conditions can be those which are usually employed in the art when working with proteins at similar alcohol concentrations, for example, from 10° C. to the freezing point of the mixture. In practice, it has been found that a safe range is from 5° C. to a —5° C. In practicing the invention, the alcohol or concentrated alcohol solution is added to the aqueous solution of the protein mixture until the desired alcohol concentration is achieved. The TSH precipitate is then allowed to form by standing for a period of time, after which the TSH precipitate can be separated from the supernatant by various standard procedures, such as filtration and centrifugation.

The alcohol fractionation step of this invention is preferably integrated into an extraction and purification scheme for preparing a thyrotropic hormone preparation from thyrotropic hormone-bearing pituitary material wherein an aqueous solution of TSH is obtained at one point in the process. The following examples will illustrate the preferred method of integrating the alcohol fractionation procedure with other process steps. However, it will be understood from the above that the use of the alcohol fractionation step is broadly applicable to the separation of aqueous solutions containing TSH and gonadotropin or other non-thyroid stimulating proteins.

EXAMPLE I

The preferred procedure for producing TSH according to this invention is as follows:

(1) *Starting material.*—Fresh or frozen anterior pituitary tissue, or acetone-dried anterior pituitary powder may be used. Depending upon the form of the material, the pituitary tissue is reduced to a state of fine division by grinding, etc., if fresh; comminuting, etc., if frozen; or milling, etc., if necessary, when in a dried powder form.

(2) *Extraction.*—The finely divided pituitary tissue or powder is added in proportions of 0.5% to 10% by weight to a 1.5 to 2.5% sodium chloride solution or in distilled water. (In practice a 2% NaCl solution, i. e., approximately 0.34 M is used.) The pH of the mixture is adjusted to 6.0–8.8 (preferably 7.5), by means of a water soluble alkaline salt, e. g. solid, potassium, or ammonium hydroxide. The pH is checked and readjusted for about 4 hours after suspending. The mixture is stirred overnight (12–16 hours) at 0° C. Under these conditions inert proteins and some growth hormone and prolactin are precipitated, while the TSH and gonadotropin remains in solution. At the end of the extraction period (12–16 hours), the residue pituitary tissue is removed from TSH containing solution by means of a refrigerated centrifuge at 0° C. The non-soluble residue usually represents about 500 gms./kgm. of fresh pituitary tissue.

(3) *Removal of soluble contaminant proteins.*—A second fractionation of contaminating proteins in the supernatant is made by adjusting the pH to 4.5–5.0 (4.5 preferred), using such acids as hydrochloric, sulphuric, phosphoric, or acetic acids, etc. This suspension is agitated for about 2 hours and then allowed to stand overnight at 0° C. A precipitate including further growth and prolactin hormone, occurs while the TSH and gonadotropin remains in solution. The precipitate is removed in a refrigerated centrifuge at 0° C. This precipitate fraction usually represents about 150 gms./kgm. of fresh pituitary tissue.

(4) *Precipitation of TSH.*—The TSH-containing supernatant is left in the acidified state. Pre-chilled 95% ethanol is slowly added to the supernatant, via capillary jets until the supernatant reaches a concentration of 5–35% ETOH. The addition is carried out at such a rate that the temperature decreases as the alcohol concentration increases. A final temperature of −5° C. is desirable, but the temperature should not be allowed to exceed plus 5° C. The TSH precipitate is allowed to settle overnight at approximately −5° C. The TSH precipitate is removed in a refrigerated centrifuge at −5° C. The supernatant containing gonadotropin and other proteins is discarded. The yield of TSH precipitate is about 53 gms./kgm. of fresh tissue. This yield represents 75%–90% of TSH present in starting material.

(5) *Purification of the TSH precipitate.*—The TSH precipitate is suspended in sufficient distilled water to give a protein concentration of less than 5%. The ionic strength of the suspension is adjusted to 0.34 M (2%) with NaCl. The pH is adjusted to 7.5 with NaOH. The pH is checked and readjusted for about 2 hours after suspension. This suspension is agitated overnight at 0° C. The suspension is then adjusted to pH 4.5 with HCl and stirred for one hour. The precipitate is removed in a refrigerated centrifuge at 0° C. The TSH-containing supernatant is adjusted to pH 4.0 with HCl. Pre-chilled acetone is added, via capillary jet addition, until the supernatant reaches an acetone concentration of 50%. The temperature during addition should not go above 0° C. The precipitate which forms is allowed to settle overnight. The precipitate is removed in a refrigerated centrifuge at 0° C. (This precipitate can be reworked to insure removal of all TSH present.)

The TSH-containing supernatant is brought to 80% acetone by the addition of 1½ volumes of acetone. The TSH precipitate formed by 80% acetone is allowed to settle overnight. The TSH precipitate is removed by centrifugation at −5° C. This is dried by lyophilization. The final yield is approximately 1.75 gms./kgm. of fresh pituitary tissue.

EXAMPLE II

Nineteen and one-half pounds of fresh, frozen beef anterior pituitary glands were reduced to a fine state of division by comminuting. 8.7 kgms. of the comminuted material were suspended in 35 liters of cold, distilled water, yielding a concentration of 5% protein. The ionic strength of this suspension was adjusted to 0.34 M by the addition of 690 gms. of sodium chloride. The pH of the suspension which was 6.25 was adjusted to pH 7.5 by the addition of 61 mls. of 5 N sodium hydroxide. This suspension was stirred for three hours. The inert tissue was removed from the suspension by centrifuging. The centrifugate (36 liters) was adjusted to pH 4.45 by the addition of 180 mls. of 4 N hydrochloric acid. After stirring for one hour, the solution was allowed to stand overnight at 0° C. The resulting precipitate was removed by centrifuging. The centrifugate (35 liters) was then brought to a concentration of 30% alcohol by volume by the slow addition of 16.2 liters of pre-chilled 95% 3 A alcohol. This mixture was stirred for one hour. The resulting precipitate was removed by centrifuging at −5° C., and the supernatant discarded. The precipitate was suspended in 3 volumes of cold, distilled water and the pH adjusted to 6.5. This suspension was allowed to stand overnight at 0° C. The suspension was then frozen and dried in vacuo yielding 20.4 gms. of dried material exhibiting an activity of 16% of standard.

19 grams of this dried material plus 43 grams of similar material obtained by using the same procedure as above were pooled, reworked and purified in the following manner:

The pooled material (62 gms. of impure TSH) was dissolved in 3.6 liters of 1% sodium chloride solution. The pH was adjusted to 4.05 by the addition of normal hydrochloric acid and the resulting mixture cooled to 0° C. One volume (3.6 liters) of pre-cooled acetone (−40° C.) was slowly added to the mixture with care to maintaining a low temperature. This mixture was stirred for one hour and allowed to stand overnight. The resulting precipitate was removed by centrifuging; the supernatant and precipitate both being saved. The precipitate was suspended at a 2% protein concentration weight in a 1% sodium chloride solution. 1750 mls. of pre-cooled acetone were added to this suspension. The precipitate formed was removed by centrifuging and decanted. The combined supernatants from this and the previous step yielded a volume of 10.5 liters. Sixteen liters of pre-cooled acetone were added to the suspension and the mixture allowed to settle out. The precipitate was removed, frozen and dried in vacuo. A yield of 6 grams of purified, dried material was obtained. This TSH assayed at 250±52% of standard.

EXAMPLE III

Fresh, frozen, comminuted beef anterior pituitary glands were suspended in cold, distilled water and the ionic concentration brought to 0.34 by the addition of sodium chloride. The pH of the suspension was adjusted to 7.8 with normal sodium hydroxide and stirred. The inert tissue was removed from the suspension by centrifuging at 35° F. The supernatant was adjusted to pH 4.4 with 4 N hydrochloric acid and stirred. The resulting precipitate was removed by centrifuging. The supernatant was divided into aliquot portions. To these were added respectively: methanol, ethanol, and n-propanol, to a final concentration of 20% by volume.

The resultant precipitates were recovered, dried and assayed for thyrotropic activity. The activity of these samples are tabulated in Table I.

Table I

| Sample No. | Solvent Used | Activity |
| --- | --- | --- |
| 1 | Methanol | 32.9 ± 4.4% of standard. |
| 2 | Ethanol | 23.7 ± 6.1% of standard. |
| 3 | n-Propanol | 38.2 ± 7.4% of standard. |

EXAMPLE IV

The procedure employed in this example was identical to the method followed in Example III except that the concentration of organic solvent used to precipitate the TSH activity was increased to 30% by volume instead of the 20% used in the previous example.

The results of using 30% concentrations of the aforementioned solvents are listed in Table II.

Table II

| Sample No. | Solvent Used | Activity |
| --- | --- | --- |
| 1 | Methanol | 23 ± 17% of standard. |
| 2 | Ethanol | 52 ± 34% of standard. |
| 3 | n-Propanol | 33 ± 19% of standard. |

The results tabulated in Tables I and II indicate the type of alcohols which can be utilized in practicing this invention. It must be noted, however, that the activities listed in Tables I and II correspond to the initial precipitation of TSH from a solution containing the hormone and accordingly do not represent the greatly increased activity that can be realized by further purification of such material as disclosed in this specification.

While in the foregoing specification this invention has been described in considerable detail in relation to certain specific embodiments thereof, it will be apparent to those skilled in the art that many of the details set forth and the specific embodiments can be varied widely without departing from the broad idea of the invention.

We claim:

1. In a process for preparing a thyrotropic hormone preparation from thyrotropic hormone-bearing pituitary material wherein an aqueous solution of thyrotropin and other non-thyroid stimulating proteins is obtained including gonadotropin, the method of selectively precipitating the thyrotropin characterized by adding a mono-hydroxy alkane containing less than 4 carbon atoms to said aqueous solution until the concentration thereof is from 5 to 35% by volume, while maintaining the aqueous solution at a temperature in the range of 10° C. to the freezing point of the mixture, the bulk of said gonadotropin remaining in the supernatant solution.

2. The process of claim 1 in which said mono-hydroxy alkane is selected from the group consisting of ethanol, methanol, propanol and isopropanol.

3. The process of claim 1 in which siad mono-hydroxy alkane is ethanol.

4. In a process for preparing a thyrotropin preparation from cattle pituitary glands wherein an aqueous solution of thyrotropin and other non-thyroid stimulating proteins is obtained including gonadotropin, the method of selectively precipitating the thyrotropin characterized by adding ethanol to said aqueous solution until the concentration thereof is from 5 to 35% by volume while maintaining the said solution at a temperature in the range of about 5° C. to —5° C., precipitating a thyrotropin fraction, and separating said thyrotropin fraction from the supernatant solution, the bulk of said gonadotropin remaining in the supernatant solution.

5. The process of claim 4 in which said ethanol is added until the concentration thereof is from 15 to 35%.

6. The method of separating thyrotropin from gonadotropin, comprising forming an aqueous solution of a protein mixture including thyrotropin and gonadotropin, adding a mono-hydroxy alkane containing less than 4 carbon atoms to said aqueous solution until the concentration thereof is from 5 to 35% by volume to precipitate a thyrotropin fraction, said precipitation being carried out at a pH within the range from 4.0 to 5.0 and at a temperature below 10° C., and separating the thyrotropin fraction from the supernatant containing the gonadotropin.

7. The method of claim 6 in which said mono-hydroxy alkane is selected from the group consisting of ethanol, methanol, propanol and isopropanol.

8. The method of claim 6 in which said mono-hydroxy alkane is ethanol.

9. The method of claim 6 in which said mono-hydroxy alkane is ethanol and in which said ethanol is added until the concentration is from 15 to 30% by volume.

10. The method of producing a thyrotropin preparation, including the steps of subjecting anterior pituitary tissue to an aqueous extraction to obtain an extract containing thyrotropin, gonadotropin and other non-thyroid stimulating proteins, separating said extract from the pituitary material residue, adjusting the pH of the extract to between 6.0 and 8.0 to precipitate a portion of the non-thyroid stimulating proteins, separating the supernatant from the precipitate, adjusting the pH of the supernatant to from 4.0 to 5.0 to precipitate additional quantities of non-thyroid stimulating proteins, separating the supernatant from the precipitate, adding a mono-hydroxy alkane containing less than 4 carbon atoms to said second-mentioned supernatant until the concentration thereof is from 5 to 35% by volume to precipitate the thyrotropin while leaving the gonadotropin in solution while maintaining the said supernatant at a temperature in the range of 5° C. to —5° C., and separating the thyrotropin precipitate from the solution containing the gonadotropin.

11. The method of claim 10 in which said mono-hydroxy alkane is selected from the group consisting of ethanol, methanol, propanol and isopropanol.

12. The method of claim 10 in which said mono-hydroxy alkane is ethanol.

References Cited in the file of this patent

UNITED STATES PATENTS 2,085,768    Schoeller et al. _____ July 6, 1937

OTHER REFERENCES

Anderson: J. of Physiol., vol. 82, 1934, pp. 11–25, part. pp. 11, 22 and 23.

White: The Chem. and Physiol. of Hormones, 1944, pp. 8–13.

White: Physiol. Reviews, October 1946, pp. 589–593.

Cohn: Experientia, vol. 3, 1947, p. 129.

Haurowitz: Progress in Biochem., 1950, Intersci. Publ., Inc., N. Y., pp. 120 and 121.